US012617042B2

(12) United States Patent
Hann

(10) Patent No.: US 12,617,042 B2
(45) Date of Patent: May 5, 2026

(54) LASER APPARATUS USING OPTICAL FIBERS FOR STABLE LASER WELDING, AND LASER WELDING METHOD USING SAME

(71) Applicant: KOREA PHOTONICS TECHNOLOGY INSTITUTE, Gwangju (KR)

(72) Inventor: Swook Hann, Gwangju (KR)

(73) Assignee: KOREA PHOTONICS TECHNOLOGY INSTITUTE, Gwangju (KR)

( * ) Notice: Subject to any disclaimer, the term of this patent is extended or adjusted under 35 U.S.C. 154(b) by 539 days.

(21) Appl. No.: 17/921,981

(22) PCT Filed: Jun. 18, 2021

(86) PCT No.: PCT/KR2021/007701
§ 371 (c)(1),
(2) Date: Oct. 28, 2022

(87) PCT Pub. No.: WO2022/050538
PCT Pub. Date: Mar. 10, 2022

(65) Prior Publication Data
US 2023/0264300 A1 Aug. 24, 2023

(30) Foreign Application Priority Data

Sep. 4, 2020 (KR) ........................ 10-2020-0113065

(51) Int. Cl.
B23K 26/70 (2014.01)
B23K 26/06 (2014.01)
(Continued)

(52) U.S. Cl.
CPC ........ B23K 26/702 (2015.10); B23K 26/0608 (2013.01); B23K 26/064 (2015.10); B23K 26/21 (2015.10)

(58) Field of Classification Search
CPC .... B23K 26/702; B23K 26/064; B23K 26/21; B23K 26/0608; G02F 1/0115
(Continued)

(56) References Cited

U.S. PATENT DOCUMENTS

| | | | | |
|---|---|---|---|---|
| 6,275,250 B1 * | 8/2001 | Sanders | ............... | B23K 26/032 |
| | | | | 347/237 |
| 8,452,145 B2 * | 5/2013 | Li | ...................... | G02B 6/03611 |
| | | | | 385/127 |

(Continued)

FOREIGN PATENT DOCUMENTS

| | | |
|---|---|---|
| CN | 101564799 A | 10/2009 |
| CN | 109997285 A | 7/2019 |

(Continued)

OTHER PUBLICATIONS

English Specification of JP2004-358521A.
(Continued)

*Primary Examiner* — Jimmy Chou
(74) *Attorney, Agent, or Firm* — Dinsmore & Shohl LLP; Yongsok Choi, Esq.

(57) ABSTRACT

The present invention relates to a laser apparatus using optical fibers for stable laser welding and a laser welding method using same. Hybrid ring mode-shaped laser beams, in which a central beam using fiber laser is positioned at the center of outer beams using diode laser, are used to perform welding by irradiating a to-be-welded portion of an object with the outer beams, the central beam, and the outer beams in this order. Thus, since the welding is performed using the central beam as a heat source in a state in which the (Continued)

HEATING (TEMPERATURE X TIME)

to-be-welded portion of the object has been heated with a sufficient amount of heat input, the temperature gradient of the to-be-welded portion is low and solidification cracking does not occur. Also, problems such as spatter and voids can be minimized, and the laser welding is stable, and thus a quality of welding that is uniform and stable overall can be obtained.

8 Claims, 8 Drawing Sheets

(51) Int. Cl.
B23K 26/064 (2014.01)
B23K 26/21 (2014.01)

(58) Field of Classification Search
USPC ................................. 219/121.63; 385/27, 33
See application file for complete search history.

(56) References Cited

U.S. PATENT DOCUMENTS

| | | | | |
|---|---|---|---|---|
| 8,662,160 | B2 * | 3/2014 | DeWitt | .................... E21B 41/00 |
| | | | | 372/4 |
| 10,732,440 | B2 * | 8/2020 | Kliner | .................. B23K 26/067 |
| 2008/0053970 | A1 * | 3/2008 | Nakamae | ............. B23K 1/0056 |
| | | | | 219/121.61 |
| 2011/0042361 | A1 * | 2/2011 | Nowak | .............. B23K 26/0604 |
| | | | | 219/121.64 |

| | | | | |
|---|---|---|---|---|
| 2018/0214979 | A1 * | 8/2018 | Koponen | ............... B23K 26/38 |
| 2018/0214980 | A1 * | 8/2018 | Gross | ................. G02B 27/0994 |
| 2018/0214985 | A1 * | 8/2018 | Victor | .................... B33Y 40/10 |
| 2018/0215650 | A1 * | 8/2018 | Brown | ...................... G02B 6/14 |
| 2018/0217385 | A1 * | 8/2018 | Rivera | ................. G02B 6/0288 |
| 2018/0217407 | A1 * | 8/2018 | Kliner | .................. B23K 26/064 |
| 2018/0217410 | A1 * | 8/2018 | Martinsen | .......... G02B 27/0933 |
| 2018/0239154 | A1 * | 8/2018 | Martinsen | ............ G02B 6/0008 |
| 2018/0284490 | A1 * | 10/2018 | Hemenway | .......... B23K 1/0016 |

FOREIGN PATENT DOCUMENTS

| | | | | |
|---|---|---|---|---|
| CN | 111037099 | A | 4/2020 | |
| CN | 111526966 | A * | 8/2020 | ............ B23K 26/24 |
| JP | 2004-358521 | A | 12/2004 | |
| JP | 2004-337881 | A | 6/2006 | |
| JP | 2017-207344 | A | 11/2017 | |
| KR | 10-2004-0060630 | | 7/2004 | |
| KR | 10-2012-0052486 | | 5/2012 | |

OTHER PUBLICATIONS

English Specification of JP2004-337881A.
English Specification of 10-2012-0052486.
English Specification of 10-2004-0060630.
English Specification of JP2017-207344A.
English Specification of CN111526966A.
English Specification of CN109997285A.
English Specification of CN111037099A.
English Specification of CN101564799A.

* cited by examiner

HEATING (TEMPERATURE X TIME)

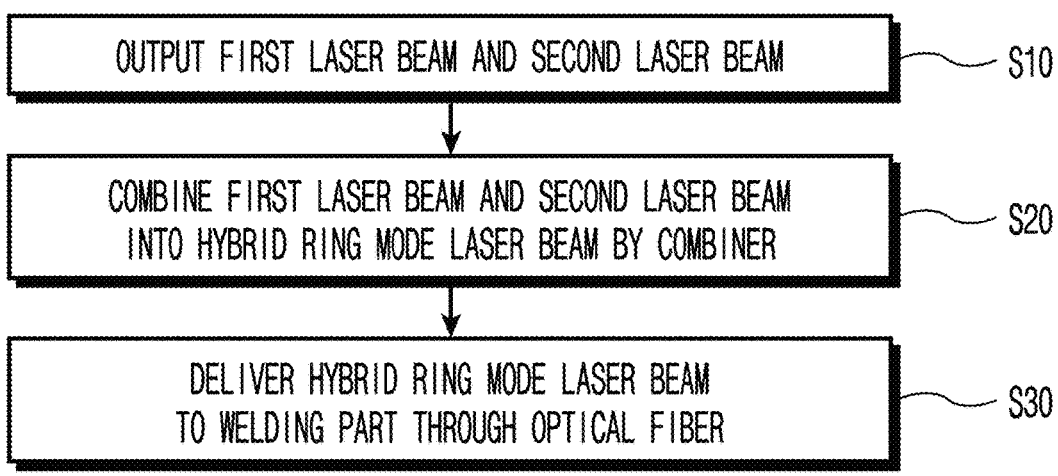

OUTPUT FIRST LASER BEAM AND SECOND LASER BEAM — S10

COMBINE FIRST LASER BEAM AND SECOND LASER BEAM INTO HYBRID RING MODE LASER BEAM BY COMBINER — S20

DELIVER HYBRID RING MODE LASER BEAM TO WELDING PART THROUGH OPTICAL FIBER — S30

FIG. 12

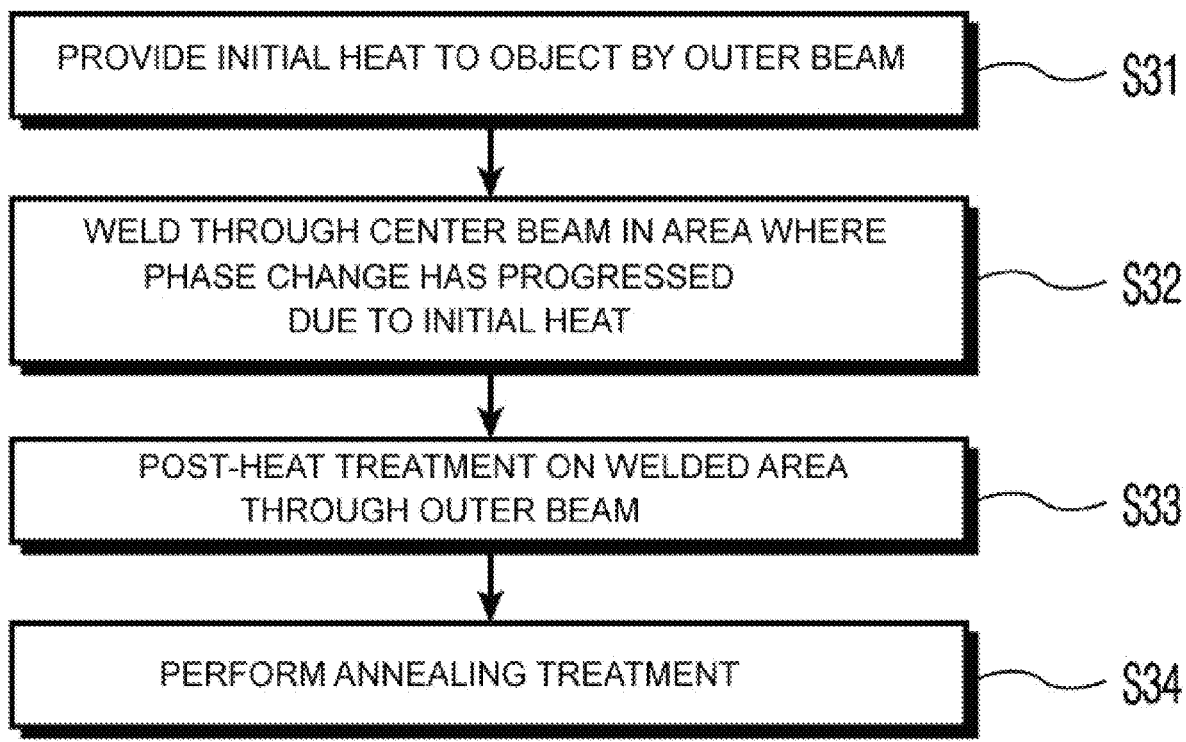

PROVIDE INITIAL HEAT TO OBJECT BY OUTER BEAM — S31

WELD THROUGH CENTER BEAM IN AREA WHERE PHASE CHANGE HAS PROGRESSED DUE TO INITIAL HEAT — S32

POST-HEAT TREATMENT ON WELDED AREA THROUGH OUTER BEAM — S33

PERFORM ANNEALING TREATMENT — S34

(a)                    (b)                    (c)

LASER APPARATUS USING OPTICAL FIBERS FOR STABLE LASER WELDING, AND LASER WELDING METHOD USING SAME

TECHNICAL FIELD

The present invention relates to a laser device for enabling stable laser welding using a laser beam having a plurality of wavelengths and a laser welding technology using the same.

BACKGROUND ART

The description in this section merely provides background information on an embodiment of the present invention and does not constitute the prior art.

Laser welding is a welding method that uses a laser beam to couple different materials. Laser welding has a high concentration of laser beam energy to cause a small heat-affected zone so that it does not change the chemical, physical, or mechanical settings of the base material. Laser vacuum welding is performed for materials susceptible to oxidation, and setting changes can be minimized. It is widely used because it has advantages in that the quality of the welding surface by laser welding is superior to that of conventional heat resistance or gas welding, and welding is performed while the laser is irradiated from a long distance, thereby enabling safe welding.

A laser processing device for processing an object using a laser is disclosed in various ways, such as Korean Patent Laid-Open No. 10-2004-0015996. Such a laser processing device includes an optical system for focusing a laser beam emitted from a laser to an object.

In conventional laser welding, a laser beam for welding is irradiated from a laser light source, and the irradiated laser beam is focused on an object to perform laser welding.

Currently, the most widely used solid-state laser for laser welding is a YAG laser that generates a light beam having a wavelength of about 1 µm, and a representative Nd: YAG laser has a fundamental wavelength of 1064 nm. In the laser welding method, the optical coupling between the object to be welded and the laser beam is important. If the optical coupling property is not good, the reflectance is high, and the absorption efficiency of laser energy is low, so it is difficult to obtain a good weld joint. A YAG laser beam with a fundamental wavelength (for example, 1064 nm) has poor optical coupling to copper or gold.

Since the 532 nm YAG laser beam has high optical coupling to metals such as copper and gold, a laser welding method in which the YAG laser beam of the second harmonic (532 nm) is superimposed on the same optical axis as the pulsed laser beam of the YAG fundamental wave to irradiate the object may be applied.

However, in the welding method of superimposing lasers of different wavelengths as described above, the keyhole or penetration depth is still insufficient because the optical coupling time of the second harmonic laser beam, which is an intermittent repetitive pulse, and the object is short. Further, the overlap rate of laser beams of different wavelengths significantly affects welding, such as the penetration depth and the uniformity of the appearance quality, thus the overlap rate for obtaining uniform heat input must be carefully selected.

Meanwhile, when the object is a metal material including an aluminum material, heat escapes to the outside because the metal material has a high thermal conductivity in laser welding under general conditions; that is, the reflection amount of heat input is increased, so the energy of the laser beam is not absorbed into the center of the welding object and escapes to the outside. Thus, the absorption rate of the laser beam is significantly reduced. Further, the metal material has a high coefficient of thermal expansion, so cracks or pores are generated due to volume change during welding, so welding cannot be performed stably. In order to solve this problem, when the output of the laser is increased, there is a problem in that the welding quality deteriorates because fragments such as spatters are generated at the welding site of a metal material or the like.

As described above, due to the properties of lasers having a short wavelength, highly reflective materials such as aluminum or copper have no choice but to have unsatisfactory welding quality due to limitations on the inherent laser beam absorptivity of the material. Therefore, there is a need for research on laser welding technology using laser beams having different characteristics to obtain high-quality joints for highly reflective materials.

DISCLOSURE

Technical Problem

In order to address the above issues, the present invention provides a laser device using an optical fiber for stable laser welding and a laser welding method using the same in which the laser beams of different wavelength bands are combined into a hybrid ring mode laser beam composed of a central beam and an outer beam to be output in the direction in which the object is positioned through the optical fiber, a hybrid ring mode laser beam is used, and the welding is performed using the central beam as a heat source while lowering the temperature gradient due to pre-heating and post-heating effects on the welding part of the object.

However, the technical issue to be achieved by the present embodiment is not limited to the technical issues as described above, and other technical issues may exist.

Technical Solution

According to one aspect of the present invention, it provides a laser device for stable laser welding using an optical fiber, the laser device comprising: a first laser light source for irradiating a first laser beam with a first wavelength band in a direction in which an object is located; a second laser light source for irradiating a second laser beam with a second wavelength band in a direction in which the object is located; a combiner comprising a plurality of optical fibers for beam combining, the combiner being connected to the first laser light source and the second laser light source so that the first laser beam is formed as a central beam, and the second laser beam is formed as an outer beam in an outer area within a preset radius based on the center beam so as to be combined into a hybrid ring mode laser beam; and a delivery optical fiber delivering the hybrid ring mode laser beam output from the combiner in a direction in which the object is located.

According to one aspect of the present invention, the device may further comprise a lens being positioned between the delivery optical fiber and the object to focus the laser beam output from the delivery optical fiber to the object.

According to one aspect of the present invention, the delivery optical fiber may comprise a core part consisting of a single core and a cladding part consisting of at least one clad, and the combiner may comprise a first beam combining optical fiber for combining the first laser beam to the core part, and at least one second beam combining optical fiber for combining the second laser beam to the cladding part.

According to one aspect of the present invention, the refractive index of the cladding part is progressively lowered as the cladding part moves away from the core part based on the core part.

In this case, the delivery optical fiber is positioned between the core part and the cladding part and further comprises an interlayer having a lower refractive index than the refractive index of the core part, and the interlayer serves as a deep between the center beam and the outer beam so that the hybrid ring mode laser beam is separated into the center beam and the outer beam to be output.

According to one aspect of the present invention, in case in which the object is a metal material including aluminum, the first laser light source outputs the first laser beam with a wavelength band of 1030 to 1090 nm, and the second laser light source outputs the second laser with a wavelength band of 780 to 980 nm.

According to one aspect of the present invention, in case in which the object is a metal material including copper, the first laser light source outputs the first laser beam with a wavelength band of 1030 to 1090 nm, and the second laser light source outputs the second laser with a wavelength band of 400 to 550 nm.

According to one aspect of the present invention, the first laser light source is composed of a fiber laser, and the second laser light source is composed of a direct diode laser (DDL).

According to one aspect of the present invention. it provides a laser welding method performed by a laser device using an optical fiber for welding by irradiating a laser to an object, the method comprising: step a) of outputting a first laser beam having a first wavelength band and a second laser beam having a second wavelength band, respectively; step b) of forming the first laser beam as a center beam and forming the second laser beam as an outer beam in an outer area within a preset radius based on the center beam to be combined into a hybrid ring mode laser beam; and step c) of delivering the hybrid ring mode laser beam in the direction of a welding part of the object through an optical fiber to perform laser welding.

According to one aspect of the present invention, the method may further comprise the step of focusing the hybrid ring mode laser beam output from the optical fiber to the welding part of the object through a lens.

Step c) comprises a core part consisting of the optical fiber as a single core and a cladding part consisting of at least one cladding and further comprises an interlayer having a lower refractive index than that of the core part between the core part and the cladding part, thereby allowing the interlayer to serve as a deep between the center beam and the outer beam so that the hybrid ring mode laser beam is separated into the center beam and the outer beam to be output.

According to one aspect of the present invention, it provides a laser welding method performed by a laser device using an optical fiber for welding by irradiating a laser to an object, the method comprising: step a) of outputting a first laser beam having a first wavelength band and a second laser beam having a second wavelength band, respectively; step b) of forming the first laser beam as a center beam and forming the second laser beam as an outer beam in an outer area within a preset radius based on the center beam to be combined into a hybrid ring mode laser beam; step c) of outputting hybrid ring mode laser beam in the direction of a welding part of the object through an optical fiber; and step d) of proceeding welding while the laser beam in the hybrid ring mode laser beam is irradiated to the welding part in the order of the outer beam, the center beam, and the outer beam according to a preset welding progress direction.

According to one aspect of the present invention, step c) comprises a core part consisting of the optical fiber as a single core and a cladding part consisting of at least one cladding and further comprises an interlayer having a lower refractive index than that of the core part between the core part and the cladding part, thereby allowing the interlayer to serve as a deep between the center beam and the outer beam so that the hybrid ring mode laser beam is separated into the center beam and the outer beam to be output.

According to one aspect of the present invention, step d) comprises: step d-1) of providing initial heat to the welding part by the outer beam initially irradiated to the welding part in the hybrid ring mode laser beam to cause a phase change in the object; step d-2) of irradiating the center beam to the welding part where the phase change has progressed to perform welding; and step d-3) of performing an annealing treatment by performing post-heat treatment while the outer beam is irradiated to the welded part where the welding has been performed.

According to one aspect of the present invention, step d-2) is performed in which the outer beam formed in the outer area of the center beam serves as an outer heat source to act as the welding heat of the center beam in a state where the heat input of the weld is preserved, and a keyhole is formed in the welding part to perform welding.

According to one aspect of the present invention, in case in which the object is a metal material including aluminum, the first laser light source outputs the first laser beam with a wavelength band of 1030 to 1090 nm, and the second laser light source outputs the second laser with a wavelength band of 780 to 980 nm.

According to one aspect of the present invention, in case in which the object is a metal material including copper, the first laser light source outputs the first laser beam with a wavelength band of 1030 to 1090 nm, and the second laser light source outputs the second laser with a wavelength band of 400 to 550 nm.

Advantageous Effects

According to the above-mentioned means for addressing the issues of the present invention, the present invention allows a hybrid ring mode laser beam to be located on a central beam using a fiber laser at the center of an outer beam using a diode laser, so that welding is performed with the heat source of the central beam while the welding part of the object is heated with a sufficient amount of heat input. Therefore, the temperature gradient of the welding part is low, solidification cracks do not occur, and problems such as spatter and pores may be minimized.

As such, the present invention may select a wavelength with high absorption according to the physical properties of the object to apply the same as a light source for initial heating. After the object undergoes a phase change by the initial heating heat, the central beam is irradiated, and the absorption of the central beam is increased, so that seam welding may be performed. The outer beam is irradiated again to the welding part where the welding has been performed by the center beam to allow annealing due to the post-heat treatment, thereby minimizing the thermal stress after welding. Therefore, the laser process may be stabilized to provide an overall uniform and stable welding quality.

DESCRIPTION OF DRAWINGS

FIG. 11 is a flowchart for illustrating an output process in a hybrid ring mode laser beam of a laser welding method using a laser device with an optical fiber according to an embodiment of the present invention.

FIG. 12 is a flowchart for illustrating a welding process using a hybrid ring mode laser beam of a laser welding method using a laser device with an optical fiber according to an embodiment of the present invention.

MODE FOR INVENTION

Figure 1:
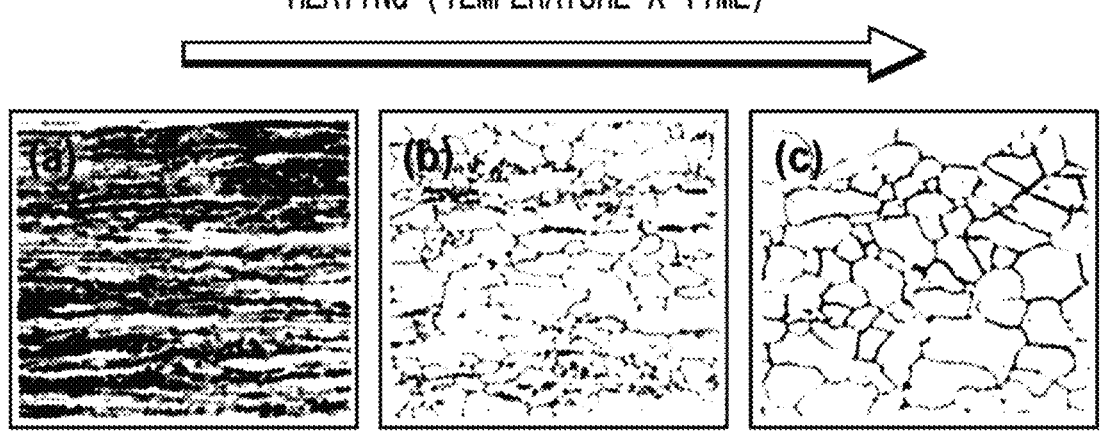
FIG. 1 is a view for illustrating a welding state of a general secondary battery connection part.

Various modifications may be made to the present invention, and various embodiments may be included. Accordingly, specific embodiments are illustrated in the drawings and described in detail. However, the present invention is not intended to be limited to specific embodiments, and it should be understood to include all modifications, equivalents and substitutes included in the spirit and scope of the present invention. In describing each figure, like reference numerals have been used for like elements.

Terms such as first, second, A, and B may be used to describe various elements, but the elements should not be limited by the terms. The above terms are used only for the purpose of distinguishing one component from another. For example, a first component may be referred to as a second component, and similarly, a second component may also be referred to as a first component without departing from the scope of the present invention. The term "and/or" includes a combination of a plurality of related described items or any of a plurality of related described items.

When a component is referred to as being "coupled" or "connected" to another component, it is understood that the component may be directly coupled or connected to another component, but other components may exist in therebetween. On the other hand, when it is said that a component is "directly coupled" or "directly connected" to another component, it should be understood that no other component is present in the middle.

The terms used in the present application are only used to describe specific embodiments and are not intended to limit the present invention. The singular expression includes the plural expression unless the context clearly dictates otherwise. It should be understood that terms such as "comprise" or "have" in the present application do not preclude the possibility of addition or existence of features, numbers, steps, operations, components, parts, or combinations thereof described in the specification in advance.

Unless defined otherwise, all terms used herein, including technical and scientific terms, have the same meaning as commonly understood by one of ordinary skill in the art to which this invention belongs.

Terms such as those defined in a commonly used dictionary should be interpreted as having a meaning consistent with the meaning in the context of the related art and should not be interpreted in an ideal or excessively formal meaning unless explicitly defined in the present application.

Further, each configuration, step, process or method included in each embodiment of the present invention may be shared within a range that does not technically contradict each other.

Hereinafter, an embodiment of the present invention is described in detail with reference to the accompanying drawings.

Figure 2:
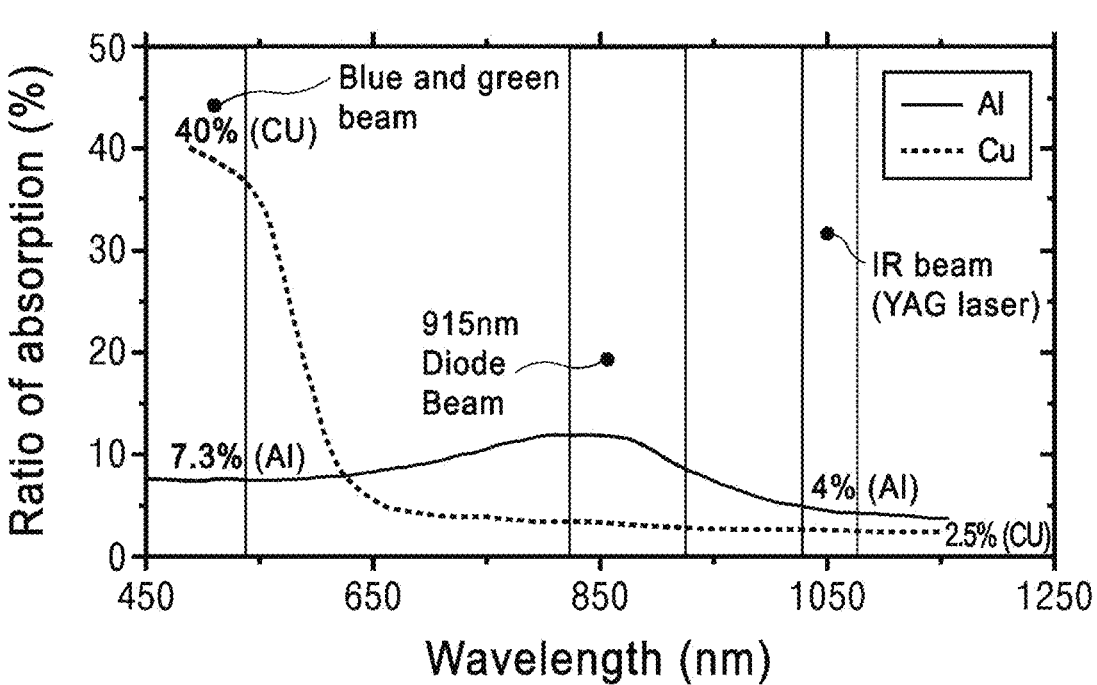
FIG. 2 is a graph for illustrating laser absorption rates according to wavelengths for objects made of copper and aluminum materials.
Figure 3:
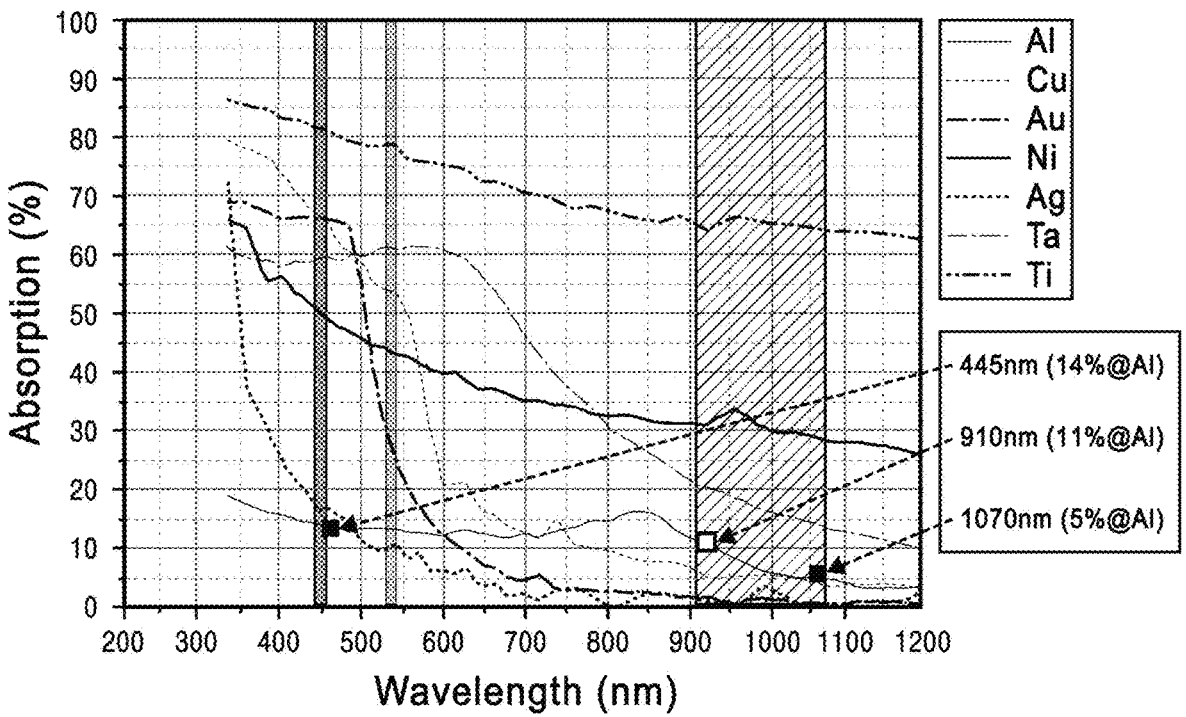
FIG. 3 is a graph for illustrating a laser absorption rate according to a wavelength for a welding object made of a metal material.

FIG. 1 is a view for illustrating a welding state of a general secondary battery connection part. FIG. 2 is a graph for illustrating laser absorption rates according to wavelengths for objects made of copper and aluminum materials. FIG. 3 is a graph for illustrating a laser absorption rate according to a wavelength for a welding object made of a metal material.

In general, a secondary battery includes a plurality of unit cells therein and is configured in such a way that a pair of external terminal tabs connected to the electrodes of each cell (that is, a tab functioning as an electrode which is provided as a pair for each battery, including one negative electrode to which the negative electrodes of each unit cell are connected and one positive electrode to which the positive electrodes of each unit cell are connected) is exposed to the outside. At this time, the tab of the cell is divided into a positive electrode tab and a negative electrode tab, and the positive electrode tab and the negative electrode tab are often made of different metals. For example, in consideration of the electrochemical stability of a secondary lithium battery, the positive electrode tab is made of aluminum (Al) and the negative electrode tab is made of copper (Cu) or nickel (Ni) plated copper. As such, it is natural that the positive electrode tab and the negative electrode tab are made of different metals in most cases in order to increase electrochemical reactivity and stability.

At this time, copper (Cu) is a metal that conducts electricity and heat well and has properties of thermal conductivity of 400 W/m-K, an atomic weight of 63.546 g/mol, a density of 8.94 g/cm$^3$, a melting point of 1084.62° C., and boiling point of 2562° C. Further, aluminum (Al) is a metal that conducts electricity and heat relatively well, and the reflectivity increases as the wavelength increases, and has properties of thermal conductivity of 237 W/m-K, an atomic weight of 63.546 g/mol, density of 2.7 g/cm³, a melting point of 660° C., and boiling point of 2495° C. (3527° C. at oxidation state).

When producing such a secondary battery, the tabs of each cell are joined by welding. Since the positive electrode tab and the negative electrode tab are made of different metals, there may be a problem in that bonding is not performed smoothly due to a difference in physical properties.

In other words, as shown in FIG. 2 and FIG. 3, the laser absorption rates of copper and aluminum are different for each wavelength band of the laser. It can be seen that a general metal such as copper has a lower light absorption rate as the wavelength increases, whereas aluminum has the best light absorption rate at 870 nm to 890 nm.

When a to-be-welded object is made of copper, and welding is performed with a YAG laser beam of a fundamental wavelength (e.g., 1064 nm), the optical coupling property between the object to be welded and the laser beam is poor, resulting in high reflectance and low energy absorption rate to the object. When the to-be-welded object is made of aluminum, and welding is performed with a YAG laser beam of a fundamental wavelength (e.g., 1064 nm), it is difficult to obtain a sufficient penetration depth, and defects such as pores and cracks frequently occur due to the high thermal expansion and contraction rate of aluminum so that the welding quality deteriorates.

In consideration of the inherent laser absorption rate of highly reflective materials such as aluminum or copper, laser beams having different characteristics must be used as welding heat sources to obtain excellent welding quality in laser welding. As shown in FIG. 3, it is difficult to secure sufficient heat input for an object made of a material with high heat transfer, and cracks or pores may be generated in an object made of a material with high thermal expansion during laser welding. Most metals expand when heated and contract when temperature decreases. Each metal has a different amount of expansion, which is measured by the coefficient of thermal expansion. The coefficient of thermal expansion of the metal material may be arranged in the order of lead>zinc>magnesium>electron> aluminum>tin>duralumin>silver>copper/brass>silver.

Therefore, an embodiment of the present invention may provide a laser device using an optical fiber capable of stably performing laser welding by applying a laser beam for outer heating shielding and a laser light source having a high absorption rate of a laser wavelength to an object made of a material with high heat transfer, thereby reducing initial reflection and enabling a stress minimization process after welding.

Figure 4:
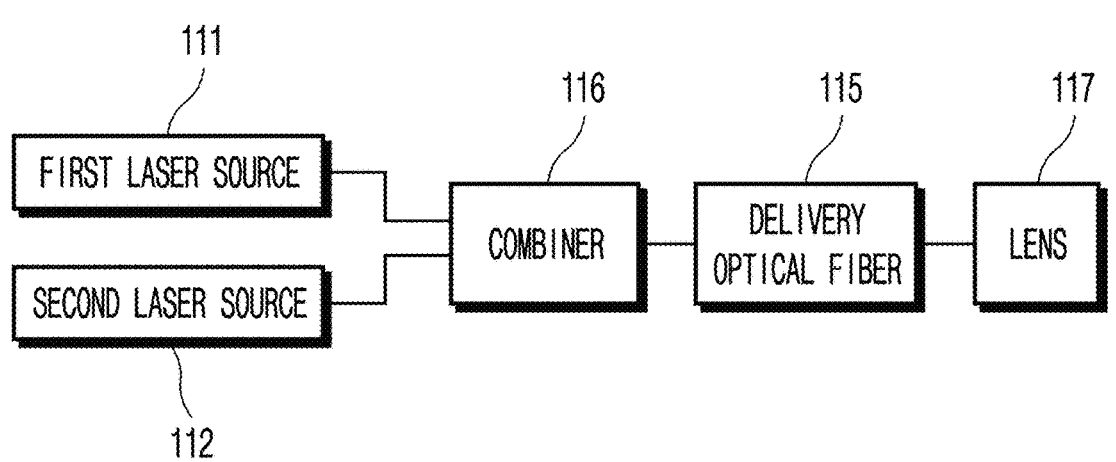
FIG. 4 is a view for illustrating the configuration of a laser device using an optical fiber for stable laser welding according to an embodiment of the present invention.
Figure 5:
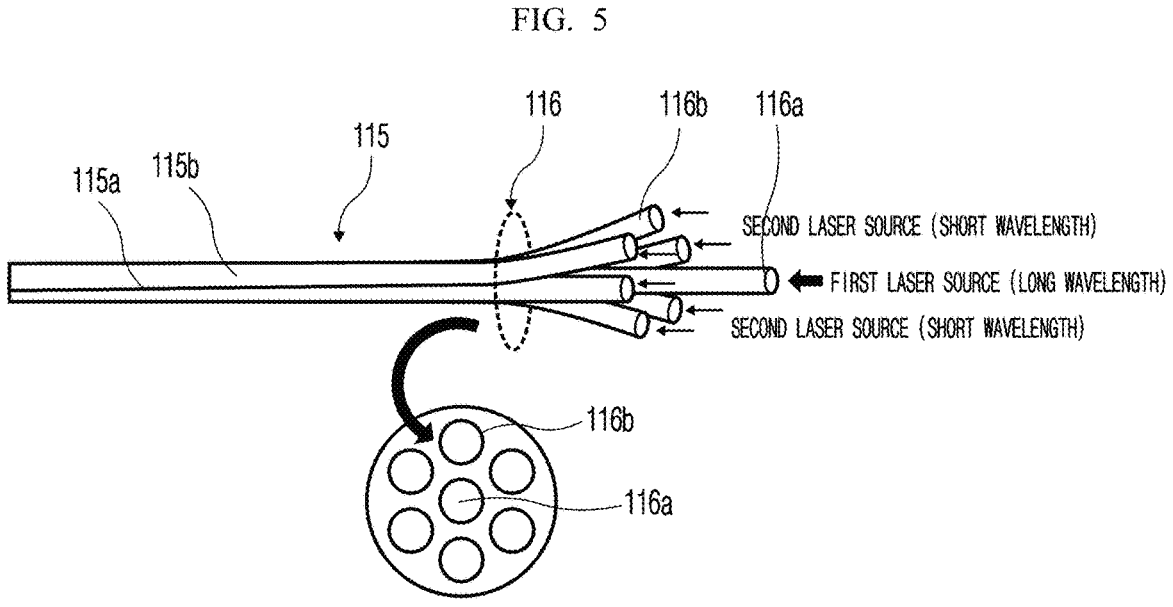
FIG. 5 is a view for illustrating the configuration of a combiner according to an embodiment of the present invention.
Figure 6:
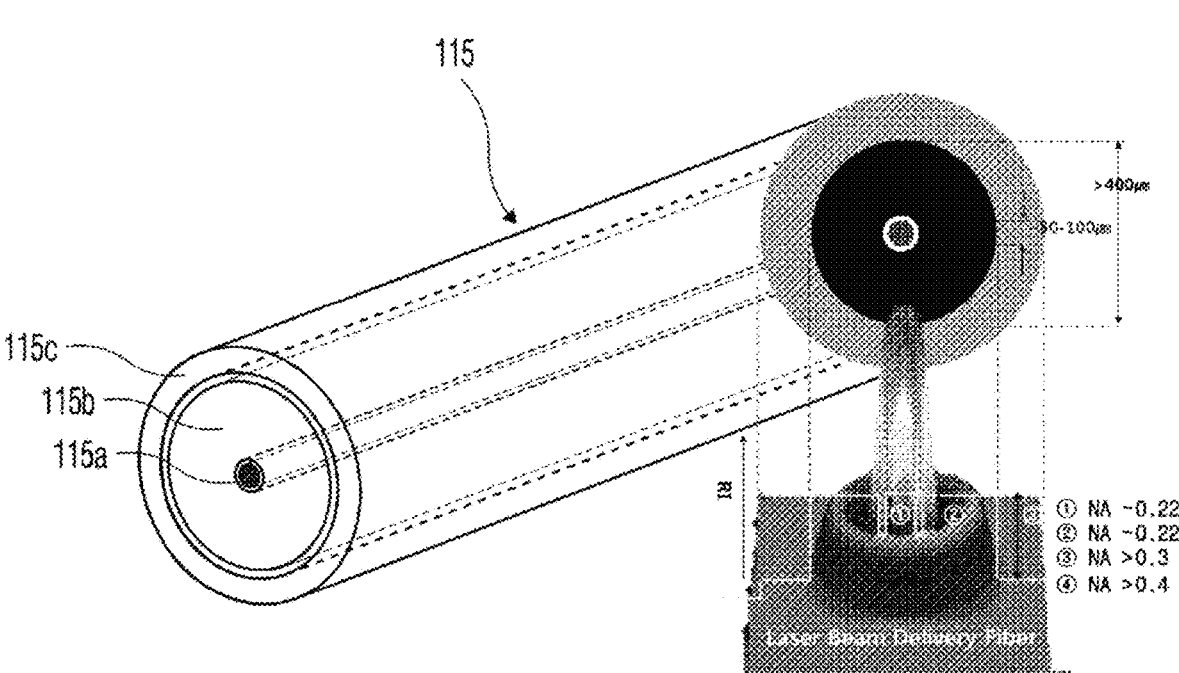
FIG. 6 is a view for explaining a delivery optical fiber according to an embodiment of the present invention.

FIG. 4 is a view for illustrating the configuration of a laser device using an optical fiber for stable laser welding according to an embodiment of the present invention. FIG. 5 is a view for illustrating the configuration of a combiner according to an embodiment of the present invention. FIG. 6 is a view for explaining a delivery optical fiber according to an embodiment of the present invention.

Referring to FIG. 4, the laser device 100 using an optical fiber for stable laser welding comprises a first laser light source 111, a second laser light source 112, a combiner 116, a delivery optical fiber 115, and a lens 117, but is not limited thereto.

The first laser light source 111 irradiates a first laser beam with a first wavelength band in a direction in which the object is positioned, and the second laser light source 112 irradiates a second laser beam with a second wavelength band in a direction in which the object is positioned. At this time, at least one object is supported by an object support (not shown) disposed at the lower portion of the laser device 100, that is, at a position where the laser beam is irradiated and may sequentially move one by one to the position where the laser beam is irradiated. Further, the laser beam output from the laser device 100 may move in a direction in which each object is located by a separate optical system.

The first laser light source 111 outputs a laser beam having excellent quality and a long wavelength band, and the second laser light source 112 outputs a laser beam having relatively low quality compared to the first laser light source 111 but economical and a lower wavelength band than that of the first laser light source 111. For example, when the object is aluminum, the first laser light source 111 may be composed of a fiber laser having a wavelength band of 1030 nm to 1090 nm, and the second laser light source 112 may be composed of a direct diode laser (DDL) having a wavelength band of 780 nm to 980 nm. When the object is copper, the first laser light source 111 may be composed of a fiber laser having a wavelength band of 1030 nm to 1090 nm, and the second laser light source 112 may be composed of a direct diode laser (DDL) having a wavelength band of 400 nm to 550 nm.

The first laser light source 111 and the second laser light source 112 are connected to one end of the combiner 116, and the delivery optical fiber 115 is connected to the other end of the combiner 116. As shown in FIG. 5, the combiner 116 forms the first laser beam output from the first laser light source 111 as a central beam and the second laser beam output from the second laser light source 112 as an outer beam in an outer region within a preset radius based on the central beam, thereby combining them into a hybrid ring mode laser beam.

The combiner 116 includes a plurality of beam coupling optical fibers 116a and 116b. The first beam coupling optical fiber 116a allows the first laser beam to be output through the core part 115a between the first laser light source 111 and the core part 115a of the delivery optical fiber 115.

A plurality of second laser output optical fibers 116b disposed to surround the periphery of the first beam coupling optical fiber 116a is located between the second laser light source 112 and the cladding part 115b of the delivery optical fiber 115, allowing the second laser beam to be output through the cladding part 115b.

The delivery optical fiber 115 transmits a hybrid ring mode laser beam output from the combiner 116 in a direction in which an object is located. The delivery optical fiber 115 includes a core part 115a made of a single core, a cladding part 115b made of at least one clad, and an acrylic coating layer 115c, wherein at least one clad has a diameter of several tens to hundreds of μm and may be of several shapes, such as round or square.

As shown in FIG. 6, the delivery optical fiber 115 has a structure including an interlayer between the core part 115a and the cladding part 115b and transmits a central beam incident to the core part 115a and an outer beam incident to the cladding part 115b. The delivery optical fiber 115 may have a core part 115a having a diameter of 50 μm to 100 μm and a cladding part 115b having a diameter of approximately 400 μm, and the refractive index (Reflective Index, RI) of the cladding part 115b increases gradually as it approaches the core part 115a.

The delivery optical fiber 115 has a Numerical Aperture (NA) value according to a diameter and a refractive index so that the center beam and the outer beam are not coupled while outputting the laser beam without loss. Here, NA is $\sqrt{n_1{}^2-n_2{}^2}$, and the relationship n1>n2 holds between the refractive index n1 of the medium 1 and the refractive index n2 of the medium 2. For example, as shown in FIG. 6, it can be selected in which the NA between the core and the interlayer (①) is about 0.22, the NA between the interlayer and the first clad (②) is about 0.22, the NA of between the first clad and the second clad (③) may be greater than 0.3, and the NA between the first clad and third clad (④) may be greater than 0.4.

When the delivery optical fiber 115 is configured with the NA value selected in this way, the high-power light source is stably operated. In particular, it can be effectively applied to a welding method using a laser beam that separates and outputs the central beam and the outer beam in space. It is designed that the NA between the core and the interlayer of the delivery optical fiber 115 has a value of 0.05 or more and 0.3 or less, the NA between the first clad and the second clad has a value of 0.05 or more and 0.3 or less, and the NA between the first clad and the third clad has a value of 0.05 or more and 0.5 or less, thereby stably transmitting the high-power light in the optical fiber to the delivery optical fiber 115.

The lens 117 is positioned between the delivery optical fiber 115 and the object to focus the laser beam output from the delivery optical fiber 115 on the object.

Figure 7:
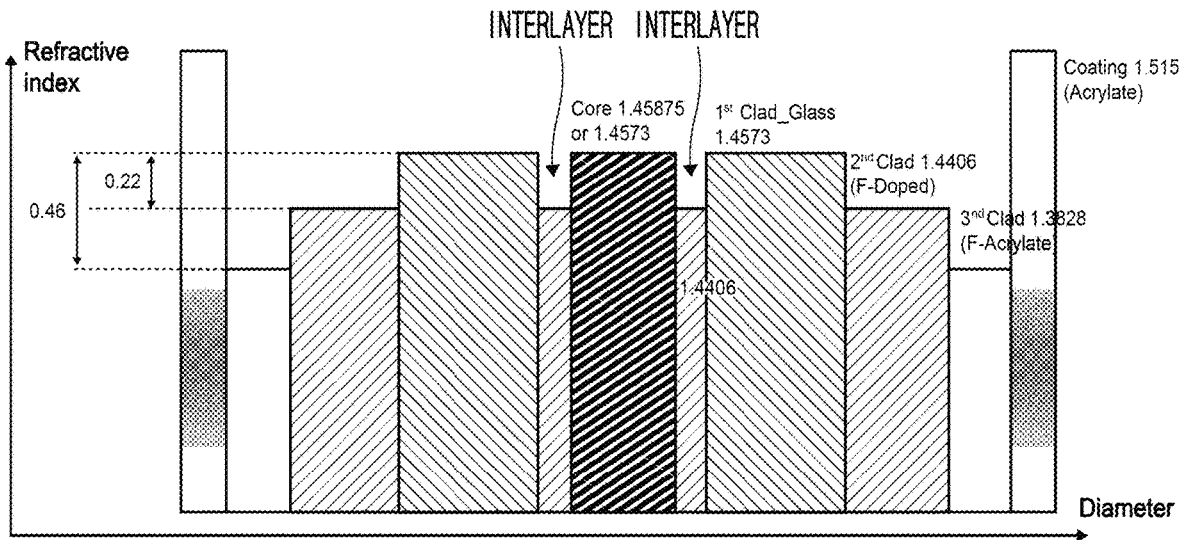
FIG. 7 is a view for illustrating a refractive index distribution of a delivery optical fiber according to an embodiment of the present invention.
Figure 8:
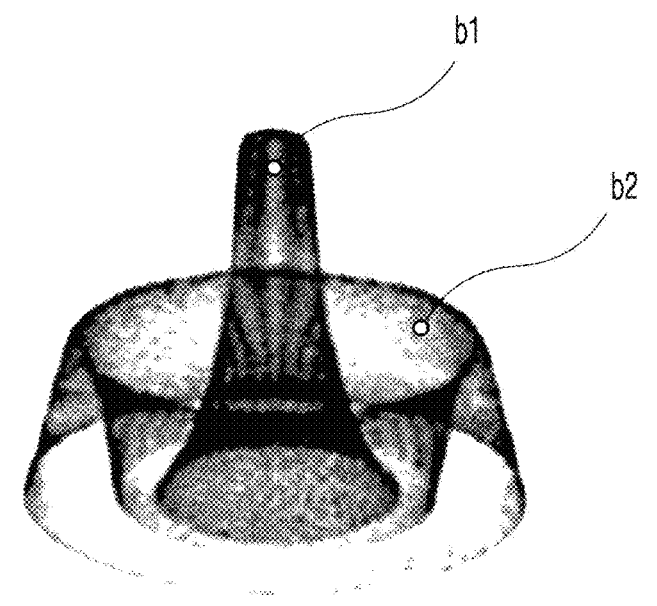
FIG. 8 is a view for illustrating a shape of a hybrid ring mode laser beam according to an embodiment of the present invention.
Figures 9, 10:
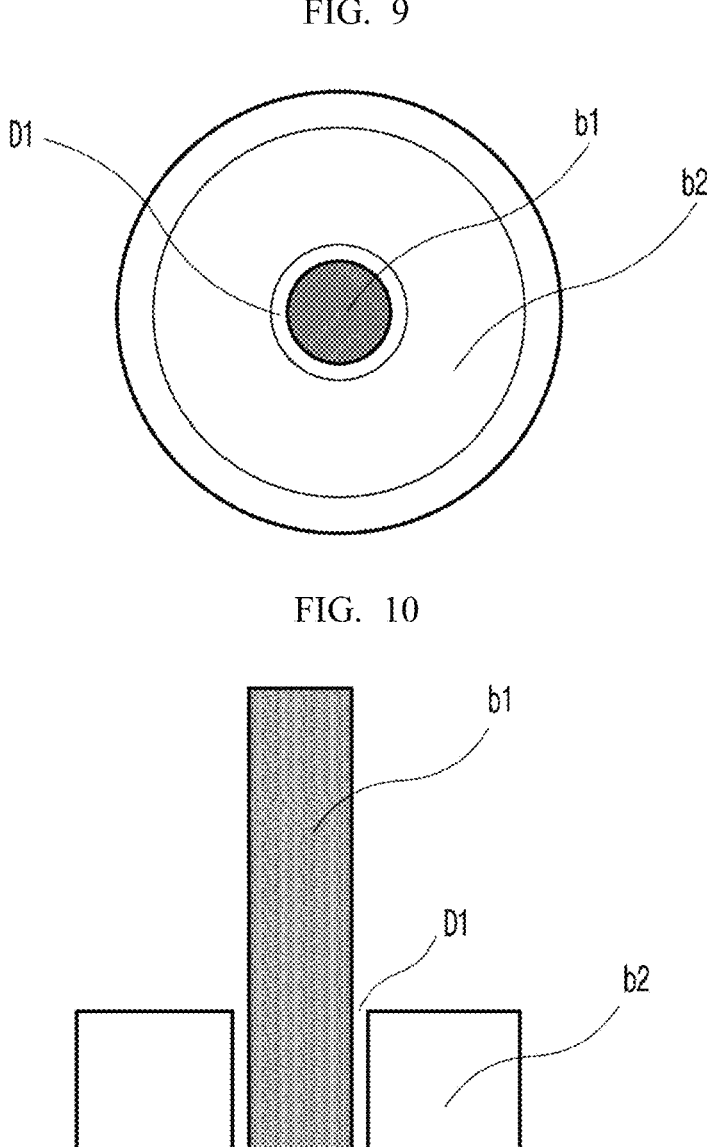
FIG. 9 is a view for illustrating a beam spot for explaining a hybrid ring mode laser beam according to an embodiment of the present invention.
FIG. 10 is a view for illustrating an intensity distribution of a hybrid ring mode laser beam according to an embodiment of the present invention.

FIG. 7 is a view for illustrating a refractive index distribution of a delivery optical fiber according to an embodiment of the present invention. FIG. 8 is a view for illustrating a shape of a hybrid ring mode laser beam according to an embodiment of the present invention. FIG. 9 is a view for illustrating a beam spot for explaining a hybrid ring mode laser beam according to an embodiment of the present invention. FIG. 10 is a view for illustrating an intensity distribution of a hybrid ring mode laser beam according to an embodiment of the present invention.

As shown in FIG. 7, the delivery optical fiber 115 comprises a core part 115a, a cladding part 115b, an interlayer formed between the core part 115a and the cladding part 115b, and an acrylic coating layer 115c. In this case, the core part 115a is made of a single core, the cladding part 115b is made of a first clad, a second clad, and a third clad, and an interlayer is positioned between the core and the first clad.

The difference in refractive index between the core and the first clad of the delivery optical fiber 115 may be approximately 0.00145 or less, the difference in refractive index between the first clad and the second clad may be 0.0167 or less, the difference in refractive index between the second clad and the third clad may be 0.0578 or less, the difference in refractive index between the core and the interlayer may be about 0.0167 or more, and the difference in refractive index between the interlayer and the first clad may be 0.0167 or less. At this time, it is preferable that the NA between the first clad and the second clad of the cladding unit 115b be about 0.22, and the NA between the first clad and the third clad be about 0.46. The second clad is designed to have the same refractive index as that of the interlayer so that light in the first clad may be guided well, and the third clad is designed to have a lower refractive index than that of the first and second dads in order to protect the external guide properties, thereby preventing light from escaping to the outside of the optical fiber.

As an embodiment, the refractive index of the core in the delivery optical fiber 115 may be 1.45875 (or 1.4573), the refractive index of the first clad may be 1.4573, the refractive index of the second clad may be 1.4406, the refractive index of the third clad may be 1.3828, the refractive index of the interlayer may be 1.4406, and the refractive index of the acrylic coating layer 115c may be 1.515. When the refractive index of the core is $n_1$ ($n_1$=1.45875) and the refractive index of the interlayer is $n_2$ ($n_2$=1.4406), NA becomes 0.229397 as $\sqrt{n_1{}^2-n_2{}^2}$, which satisfies the condition that the NA between the core and the interlayer has a value of 0.05 or more and 0.3 or less. The refractive indices of the first clad, the second clad, and the third clad may be respectively set so as to have values satisfying the design conditions for the NA values.

Further, the delivery optical fiber 115 is formed by having a core diameter of 0 to 50 μm, an interlayer diameter of 50 to 70 μm, a first clad diameter of 70 to 400 μm, a second clad diameter of 440 μm, a third clad diameter of 500 μm and an acrylic coating layer diameter of 550 μm.

The first and second laser beams combined by the combiner 116 may be output as a hybrid ring mode type laser beam composed of a central beam and an outer beam as shown in FIG. 8 and FIG. 9 while passing through the delivery optical fiber 115 due to the difference in refractive index between the core part 115a and the cladding part 115b. At this time, a beam having a relatively excellent beam quality and a long wavelength (1080 nm) is output from the laser light source, and the output beam is transmitted to the core part 115a of the delivery optical fiber 115 and output as a central beam. A beam having a relatively short wavelength (915 nm or 415 nm) is output from the laser light source, and the output beam is transmitted to the cladding part 115b of the delivery optical fiber 115 to be output as an outer beam. The output end of the delivery optical fiber 115 outputs a hybrid ring mode beam including a central beam of a long wavelength and an outer beam of a short wavelength, thereby making it economical and improving the efficiency of heat shielding.

The cladding part 115b is formed such that the refractive index gradually decreases as the distance from the core part 115a increases. The refractive index difference between the core and the first clad is set to be approximately 0.00145 or less, the refractive index difference between the first clad and the second clad is 0.0167 or less, and the refractive index difference between the second clad and the third clad is 0.0578 or less. Further, the interlayer positioned between the core and the first clad has a lower refractive index than that of the first clad and the core, the interlayer serves as a deep (D1) between the central beam and the outer beam. Accordingly, the hybrid ring mode laser beam is output through one optical fiber so that the central beam and the outer beam may be output separately in space without being coupled to each other.

As such, an embodiment of the present invention allows the focal intensity distribution of the laser beam to have a different shape from the existing single peak Gaussian distribution due to the difference in the refractive index distribution within the delivery optical fiber 115. That is, as shown in FIG. 8, the hybrid ring mode laser beam has a Gaussian distribution shape as the central beam and has a beam shape in which the laser beam is separately present in a ring shape in which the outer beam surrounds the central beam, and the center beam and the outer beam may be adjusted so that they can be output independently. For such a hybrid ring mode laser beam, pre-heating treatment with an outer beam may increase the absorption rate of the laser wavelength, seam welding can be performed by forming a keyhole with the central beam, and post-heating treatment with an outer beam may perform annealing, thereby enabling uniform and stable welding as a whole.

One embodiment of the present invention performs laser welding by irradiating a hybrid ring mode laser beam output through one optical fiber to an object, allowing the compact and lightweight device to reduce the size of the overall laser device. Further, one embodiment of the present invention uses the delivery optical fiber 115, laser welding can be performed on relatively distant objects, and the selection and arrangement of components may be flexibly determined.

Meanwhile, the cladding part 115b may have a double cylindrical shape with has a double cladding structure of an inner cladding and an outer cladding. In this case, an interlayer (inter2) that performs the same role as the interlayer (inter1) positioned between the core and the first cladding may be positioned between the inner cladding and the outer cladding, and the outer beam may be formed in a double ring shape according to the double cladding structure. When the outer beam has a double ring shape, the outer beam may be divided into an inner outer beam and an outer outer beam based on the central beam. Of the double ring-shaped outer beams, the inner outer beam is formed of n (e.g., n=6) laser light sources, and the outer outer beam is formed of m (m>n, for example, n=12) laser light sources.

As shown in FIG. 10, due to the difference in the intensity of the laser beam between the outer beam and the center beam, the outer beam sufficiently raises the temperature of the welding part of the object to increase the absorption rate of the laser wavelength, the center beam forms a keyhole to perform welding, and then, the outer beam again performs the post-heat treatment.

The laser device 100 using such an optical fiber may further comprise a pyro-monitor (not shown) as a temperature sensor, and the pyro-monitor may monitor a temperature change according to a phase change occurring on the surface of the object. Further, the laser device 100 using an optical fiber may be applied to a laser welding apparatus in a room temperature environment or a laser welding apparatus in a vacuum environment.

Figure 13:
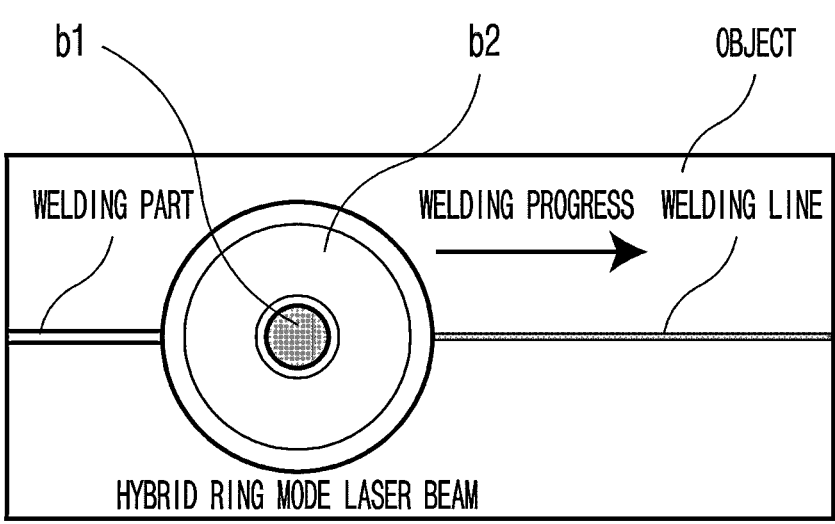
FIG. 13 is a view for illustrating a welding process for a welding part of an object according to a welding progress direction according to an embodiment of the present invention.
Figure 14:
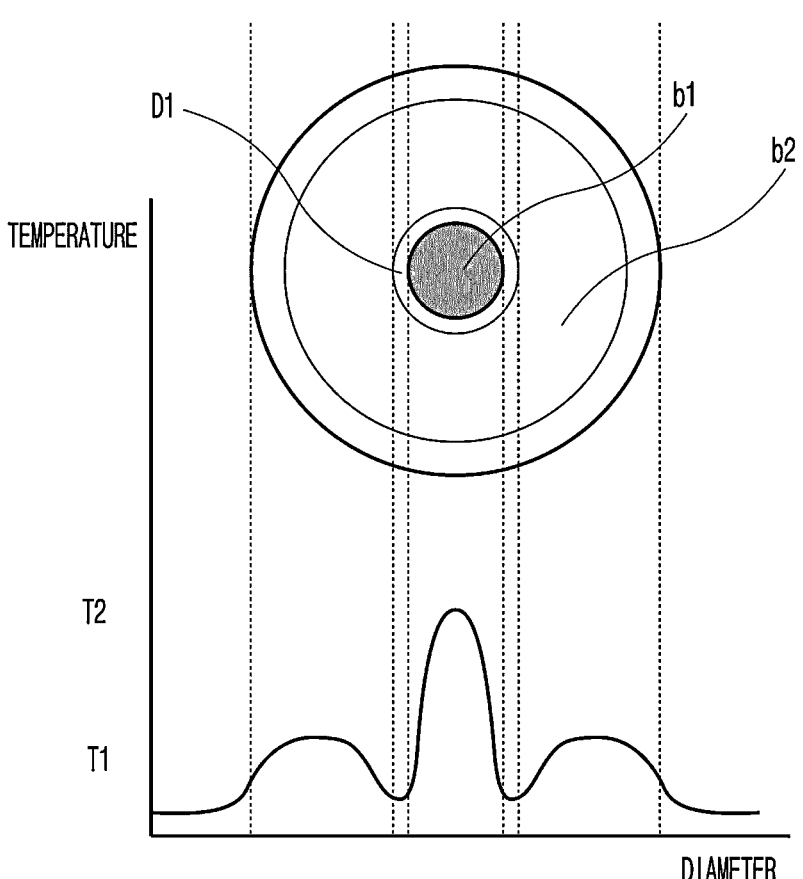
FIG. 14 is a view for illustrating a temperature profile of a hybrid ring mode laser beam according to an embodiment of the present invention.
Figure 15:
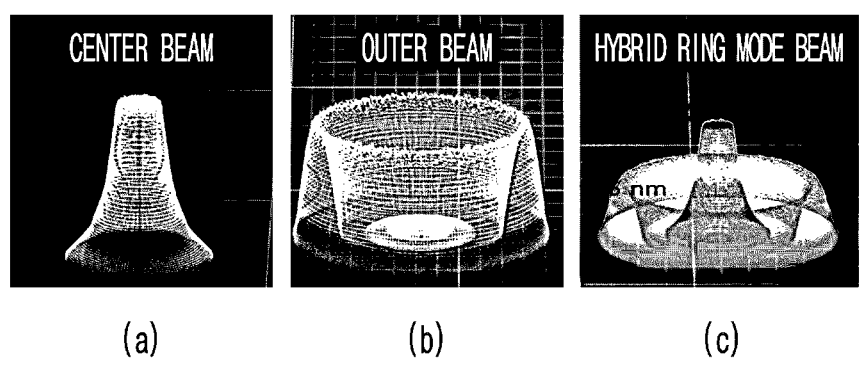
FIG. 15 is a view for illustrating various types of beam shapes according to beam mode control according to an embodiment of the present invention.
Figure 16:
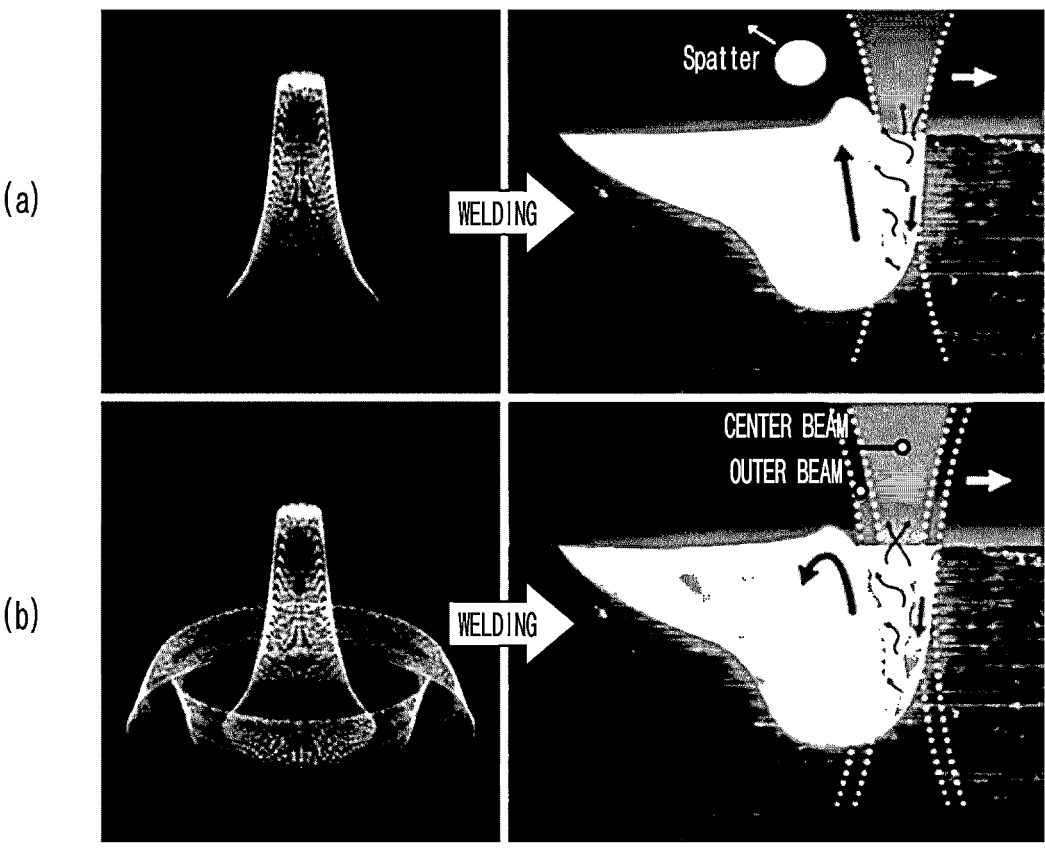
FIG. 16 is a view for illustrating a comparison between a welding state by a laser welding method using a laser welding method with an optical fiber according to an embodiment of the present invention and a general welding state using a single wavelength.

FIG. 11 is a flowchart for illustrating an output process in a hybrid ring mode laser beam of a laser welding method using a laser device with an optical fiber according to an embodiment of the present invention. FIG. 12 is a flowchart for illustrating a welding process using a hybrid ring mode laser beam of a laser welding method using a laser device with an optical fiber according to an embodiment of the present invention. FIG. 13 is a view for illustrating a welding process for a welding part of an object according to a welding progress direction according to an embodiment of the present invention. FIG. 14 is a view for illustrating a temperature profile of a hybrid ring mode laser beam according to an embodiment of the present invention. FIG. 15 is a view for illustrating various types of beam shapes according to beam mode control according to an embodiment of the present invention. FIG. 16 is a view illustrating a comparison between a welding state by a laser welding method using a laser welding method with an optical fiber according to an embodiment of the present invention and a general welding state using a single wavelength.

Referring to FIG. 11, the laser device 100 using an optical fiber outputs a first laser beam with a first wavelength band from a first laser light source 111 and a second laser beam with a second wavelength band from a second laser light source 112, respectively (S10).

The combiner 116 combines the first laser beam and the second laser beam to form a hybrid ring mode laser beam (S20). The combiner 116 couples the first laser beam to the core part 115a of the delivery optical fiber 115 so as to form a central beam and couples the second laser beam to the cladding part 115b of the delivery optical fiber 115 so as to form an outer beam in an outer region within a preset radius based on the central beam (S20).

The delivery optical fiber 115 transmits the laser beam transmitted through the core part 115a and the cladding part 115b in the direction of the welding part of the object to perform laser welding (S30).

Referring to FIG. 12 and FIG. 13, welding is performed in which the hybrid ring mode laser beam contacts the welding part of the object in the order of the outer beam, the center beam, and then the outer beam according to a preset welding direction.

First, when the outer beam is irradiated to the welding part of the object, the initial heat is provided to the welding part to cause a phase change (S31). Then, the center beam is irradiated to the welding part where the initial heat has performed the phase change to perform welding (S32). Then, the outer beam is irradiated again to the welding part where the welding has been performed to perform post-heat treatment and annealing (S32, S33).

Meanwhile, the steps of FIG. 11 and FIG. 12 may be divided into additional steps or combined into fewer steps according to an embodiment of the present invention. Further, some steps may be omitted if necessary, and the order between the steps may be changed.

As shown in FIG. 14, in the hybrid ring mode laser beam in which the central beam has a Gaussian distribution and the ring-shaped outer beam exist separately in the outer region of the central beam, the outer beam b2 provides initial heat to the solid state welding part to provide a first phase change temperature (T1), allowing a phase change from a solid state to a fluid state of the welding part. Welding proceeds due to the central beam b1 in a state where the amount of heat input is preserved in the welding part of the object, and again, the outer beam b2 provides the temperature T1 at which the welding part embrittlement does not occur, so that welding may be completed while satisfying the annealing condition. At this time, the central beam b1 allows the welding to be performed at a temperature T2 at which the welding part in a fluid state is liquefied or vaporized; that is, the second phase change temperature T2, thereby performing seam welding.

As such, the temperature change (gradient) caused by the deep D1 may effectively transfer heat flow from a high temperature point to a low temperature point. In general, when welding a non-ferrous material (such as aluminum and copper) with a large area, most of the heat is transferred to the outside in the case of a sample with a large surface area and volume, so that the temperature of the to-be-processed welding part cannot be quickly increased. However, as shown in FIG. 14, when the hybrid ring mode laser beam has a temperature gradient, the applied heat is continuously transferred to the deep D1 to increase the temperature more rapidly. This temperature rise acts as energy causing a phase change (solid->liquid->gas).

In the hybrid ring mode type laser beam of the present invention, the welding part is preheated at T1 temperature, welded at T2 temperature, and then post-heated at T1 temperature again. Since the temperature gradient from T1 to T2 and the temperature gradient from T2 to T1 are each reduced, thermal stress may be reduced, and since welding heat is applied while the phase change to a fluid state is continued, welding deformation such as thermal cracks may be suppressed.

In the prior art, the temperature rises rapidly up to T2 due to a single laser beam irradiated for laser welding without preheating or post-heating treatment. For this reason, there is a disadvantage in that thermal stress occurs due to a high temperature gradient near the welding part, and the physical properties of the object change very rapidly, resulting in welding deformation such as thermal cracks.

When the object is a metal material including aluminum, the first laser light source 111 irradiates a central beam with a wavelength band of 1030 to 1090 nm, and the second laser light source 112 irradiates the second laser beam having a wavelength band of 780 to 980 nm, particularly 910 nm. The combiner 116 combines the first laser beam as the central beam b1 and the second laser beam as the outer beam b2, and the delivery optical fiber 115 outputs a hybrid ring mode laser beam to the welding unit.

At this time, in order to overcome the high-temperature cracking and low absorption rate of the material generated during welding of a metal material including aluminum, as shown in FIG. 14, a second laser beam using a diode laser having a high absorption rate is used as an outer beam so that the preheating and postheating effect lowers the temperature gradient to prevent solidification cracking.

When it is welded using a hybrid ring-shaped laser beam, in which a first laser beam using a fiber laser forms a central beam, and a second laser beam using a diode laser forms an outer beam in an outer region of the central beam, it is welded with the heat source of the center beam in a state in which it is heated with sufficient heat input as the outer heat source of the outer beam, so that the temperature gradient of the welding part is low, and solidification cracks do not occur.

If the central beam and the outer beam overlap and output, generating a temperature difference between the center beam and the outer beam during laser welding is not easy. When a laser beam of a conventional fiber laser wavelength (1030 nm to 1090 nm) band was used, it was reflected from the surface of the non-ferrous material in the solid state at the beginning of welding. However, when the hybrid ring mode laser beam of the present invention is used, the outer beam is irradiated to the welding part and absorbed by the object more quickly to raise the temperature, and the temperature increased by the outer beam causes the surface state capable of absorbing the laser energy of the central beam irradiated to the welding part, thereby reducing reflection from the surface of the welding part. That is, the surface of the center of the welding part is not in a solid state, but the phase is changed to a liquid state by the outer beam to further increase the wavelength absorption of the laser used as the center beam. Therefore, since the wavelength absorption of the laser becomes twice as large as when irradiating the laser beam for welding in the conventional solid state, the reflection on the surface of the welding part is reduced. However, when welding is performed by irradiating the center beam in the wavelength band of 1030 nm to 1090 nm without irradiating the outer beam, a large amount of reflection occurs on the solid state surface, which often damages the irradiated fiber laser itself. Therefore, there was a disadvantage in that it was difficult to use a fiber laser for welding of non-ferrous metals.

The laser device 100 using an optical fiber for stable laser welding may perform beam mode control on a laser beam in the form of a central beam, an outer beam, and a hybrid ring mode laser beam using a controller (not shown). The controller may be implemented in a computing device including a communication module (not shown), a memory (not shown), a processor (not shown) and a database (not shown)

so as to control the operation of each component of the laser device 100 using an optical fiber. Such a controller may be implemented in a smart phone, TV, PDA, tablet PC, PC, notebook PC, and other user terminal devices.

As shown in FIG. 15(a), when only the central beam by the core of the delivery optical fiber 115 is irradiated to the object, the focused deep welding is possible, so it may be applied to seam welding where the weld area must be very small and deep. As shown in FIG. 15(b), when the outer beam is irradiated to the object, the weld pool is stabilized and the vapor channel is opened, so that it may be applied to pre-heating or post-heating. As shown in FIG. 15(c), when a hybrid ring mode beam of two wavelengths having a central beam of a long wavelength and an outer beam of a short wavelength is irradiated to an object, the weld pool may be further stabilized, so that it may be applied to the welding of not only copper but also aluminum.

As shown in Table 1, when the object is copper, the hybrid ring mode laser beam composed of the central beam and the outer beam provides an appropriate temperature for pre-heating, welding heat, and post-heating to the welding part, thereby causing a phase change of the object in solid, liquid (fluid), and vapor states. It can be seen that the laser absorption (a) changes from 5% to 10% to 60% or more based on 1 $\mu$m unit during the phase change of the object.

TABLE 1

| State (Cu) | Absorbance in NIR (1 $\mu$m) |
| --- | --- |
| Solid | ~5% |
| Fluid | ~10% |
| Keyhole (steam) | >60% |

As described above, reflection occurs when the object is in a solid state, and heat by the laser beam is not introduced into the object. In an embodiment of the present invention, a hybrid ring mode laser beam is irradiated, and an outer beam first performs a phase change. The central beam is irradiated to the portion where the phase change has progressed, thereby increasing the absorption rate, so that the amount of heat input may be preserved by the outer heat source. Further, according to an embodiment of the present invention, the best welding may be performed at the temperature at which it is liquefied or vaporized, that is, the phase change temperature, and as the absorption of the central beam increases, seam welding, that is, excellent and deeper welding quality may be obtained. Further, according to an embodiment of the present invention, the outer beam is irradiated again to the welding part where welding has been performed by the center beam so that the post-heat treatment is performed, thereby performing an annealing treatment and reducing stress due to the annealing of the outer beam.

As shown in FIG. 16, when an object is welded by a conventional laser beam of a single wavelength, the laser beam is no longer irradiated to the welding part where the welding is completed according to the welding progress direction, so the heat of the welding part is rapidly cooled. As a result, the gas generated from the object cannot be discharged to the outside during welding, pores may be generated in the welding part, and fragments such as spatters may be generated to deteriorate the welding quality.

However, in an embodiment of the present invention, since the hybrid ring mode laser beam welds an object, the outer beam is irradiated to the welding part where welding is completed with the center beam according to a preset welding progress direction, and the outer heat source preserves the heat input. Accordingly, it can be seen that the gas generated from the object during welding may be discharged to the outside, and the generation of fragments such as spatter is significantly reduced.

As such, an embodiment of the present invention initially irradiates an outer beam to an object using a diode laser that is economically and physically optimized using a hybrid ring mode laser beam with two different wavelengths. The outer beam may be set to have a wavelength band of 400 nm to 550 nm when the object is copper and 780 nm to 980 nm when the object is aluminum.

The outer beam using such a diode laser has higher absorption for an object than a general fiber laser (1030 nm to 1090 nm), so it is more efficiently absorbed by the object and can heat the object. At this time, the object is heated by the outer beam, and a phase change occurs in the solid state object. Thus, the central beam with high focusing (for example, a laser beam in the wavelength band of 1030 nm to 1090 nm by a fiber laser) is irradiated to the welding part through which the outer beam has passed, so that the welding heat is sufficiently absorbed in the welding part, and the object is melted quickly and easily, resulting in high quality welding.

Meanwhile, when the absorption rate of the laser beam is low at the beginning of laser welding, the pre-heating time is long until it is heated and the phase change occurs, and contaminants that affect the welding quality such as spatter are generated, which not only deteriorates the welding quality but also makes the welding process uncomfortable. Accordingly, the laser welding method using a hybrid ring mode laser beam with an outer beam and a central beam proposed in the present invention enables the welding of objects such as non-ferrous materials with high thermal conductivity and low absorption by fiber laser.

FIG. 11 and FIG. 12 describe that each process is sequentially executed, but this is merely illustrative of the technical idea of an embodiment of the present invention. In other words, a person of ordinary skill in the art to which an embodiment of the present invention pertains may change the order described in each drawing within a range without departing from the essential properties of an embodiment of the present invention or apply various modifications and variations to parallel execution of one or more processes among processes, so that FIG. 11 and FIG. 12 are not limited to a time-series order.

Meanwhile, the processes shown in FIG. 11 and FIG. 12 may be implemented as computer-readable codes on a computer-readable recording medium. The computer-readable recording medium includes all kinds of recording devices in which data readable by a computer system is stored. That is, the computer-readable recording medium includes a magnetic storage medium (e.g., a ROM, a floppy disk, a hard disk, etc.) and an optical readable medium (e.g., a CD-ROM, a DVD, etc.). Further, the computer-readable recording medium is distributed in a network-connected computer system so that the computer-readable code can be stored and executed in a distributed manner.

The above description of the present invention is for illustration, and it will be understood by those of ordinary skill in the art to which the present invention pertains that it can be easily modified into other specific forms without changing the technical spirit or essential features of the present invention. Therefore, it should be understood that the embodiments described above are illustrative in all respects and not restrictive. For example, each component described as a single type may be implemented in a distributed manner, and likewise components described as distributed may also be implemented in a combined form.

The scope of the present invention is indicated by the following claims rather than the above detailed description, and all changes or modifications derived from the meaning and scope of the claims and their equivalent concepts should be interpreted as being included in the scope of the present invention.

This patent application is the result of research carried out with the support of the Korea Evaluation Institute of Industrial Technology with funding from the Korean government (Ministry of Trade, Industry and Energy) in 2020 (Project ID Number: 1415169624, Detailed Project Number: 20012887, Project Name: Development of bonding technology for secondary battery non-ferrous power system parts using coaxial dual beam and visible laser).

The invention claimed is:

1. A laser device for stable laser welding, the laser device comprising:

a first laser light source for irradiating a first laser beam with a first wavelength band of 1030 to 1090 nm in a direction in which an object is located;

a second laser light source for irradiating a second laser beam with a second wavelength band of 400 to 480 nm or 800 to 980 nm in a direction in which the object is located;

a combiner comprising a plurality of beam coupling optical fibers, the combiner for combining the first laser light source and the second laser light source so that the first laser beam is formed as a central beam, and the second laser beam is formed as an outer beam in an outer area within a preset radius based on the center beam so as to be combined into a hybrid ring mode laser beam; and a delivery optical fiber for delivering the hybrid ring mode laser beam output from the combiner in a direction in which the object is located, wherein the delivery optical fiber comprises a core part, a first clad, a second clad, a third clad, an interlayer formed between the core part and the first clad, and acrylic coating layer;

wherein a diameter of the core part is 50 μm or less, a diameter of the interlayer is 50 to 70 μm, a diameter of the first clad is 70 to 400 μm, a diameter of the second clad is 440 μm, a diameter of the third clad is 500 μm, and a diameter of the acrylic coating layer is 550 μm;

wherein a difference in refractive index between the core part and the first clad of the delivery optical fiber is 0.00145 or less, a difference in refractive index between the first clad and the second clad is 0.0167 or less, a difference in refractive index between the second clad and the third clad is 0.0578 or less, a difference in refractive index between the core and the interlayer is 0.0167 or more, and a difference in refractive index between the interlayer and the first clad is 0.0167 or less; and wherein numerical aperture (NA) between the first clad and the second clad is 0.22, and NA between the first clad and the third clad is 0.46.

2. The laser device of claim 1, further comprising a lens being positioned between the delivery optical fiber and the object to focus the laser beam output from the delivery optical fiber to the object.

3. The laser device of claim 1, wherein the delivery optical fiber comprises the core part consisting of a single core and a cladding part consisting of at least one clad, and wherein the combiner comprises a first beam combining optical fiber for combining the first laser beam to the core part, and at least one second beam combining optical fiber for combining the second laser beam to the cladding part.

4. The laser device of claim 3, wherein the refractive index of the cladding part is progressively lowered as the cladding part moves away from the core part based on the core part.

5. The laser device of claim 3, wherein the delivery optical fiber comprises the core part and the cladding part and further comprises an interlayer having a lower refractive index than the refractive index of the core part, and wherein the interlayer serves as a deep between the center beam and the outer beam so that the hybrid ring mode laser beam is separated into the center beam and the outer beam to be output.

6. The laser device of claim 1, wherein the object is a metal material including aluminum so that the first laser light source outputs the first laser beam with the wavelength band of 1030 to 1090 nm, and the second laser light source outputs the second laser with the wavelength band of 800 to 980 nm.

7. The laser device of claim 1, wherein the object is a metal material including copper so that the first laser light source outputs the first laser beam with the wavelength band of 1030 to 1090 nm, and the second laser light source outputs the second laser with the wavelength band of 400 to 480 nm.

8. The laser device of claim 1, wherein the first laser light source is composed of a fiber laser, and the second laser light source is composed of a direct diode laser (DDL).

\* \* \* \* \*